(12) United States Patent
Spanks

(10) Patent No.: US 7,658,590 B1
(45) Date of Patent: Feb. 9, 2010

(54) TURBINE AIRFOIL WITH MICRO-TUBES EMBEDDED WITH A TBC

(75) Inventor: William A. Spanks, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 462 days.

(21) Appl. No.: 11/529,455

(22) Filed: Sep. 27, 2006

Related U.S. Application Data

(60) Provisional application No. 60/722,816, filed on Sep. 30, 2005.

(51) Int. Cl.
*F01D 5/18* (2006.01)

(52) U.S. Cl. .................. 415/115; 29/888.7; 29/889.72; 29/458; 416/229 A

(58) Field of Classification Search .................. 415/115, 415/200; 416/97 R, 229 A, 241 B, 241 R; 29/889.7, 889.71, 889.721, 889.722, 458
See application file for complete search history.

(56) References Cited

U.S. PATENT DOCUMENTS

| | | | |
|---|---|---|---|
| 4,080,095 A * | 3/1978 | Stahl ......................... 415/178 |
| 5,951,254 A | 9/1999 | Sikorski et al. |
| 6,113,722 A * | 9/2000 | Hoffman et al. ............. 156/155 |
| 6,368,060 B1 * | 4/2002 | Fehrenbach et al. ........ 416/97 R |
| 6,551,061 B2 | 4/2003 | Darolia et al. |
| 6,617,003 B1 | 9/2003 | Lee et al. |
| 6,720,087 B2 | 4/2004 | Fried et al. |
| 6,749,396 B2 * | 6/2004 | Barry et al. .................. 415/115 |
| 6,761,956 B2 | 7/2004 | Lee et al. |
| 6,905,302 B2 * | 6/2005 | Lee et al. ..................... 415/115 |

* cited by examiner

*Primary Examiner*—Edward Look
*Assistant Examiner*—Ryan H Ellis
(74) *Attorney, Agent, or Firm*—John Ryznic

(57) ABSTRACT

A turbine airfoil with a thermal barrier coating applied to the surface for protection from a hot gas flow, where the TBC includes a plurality of micro-tubes extending from a cooling hole in the airfoil substrate and passing through the TBC to provide both reinforcement to and cooling of the TBC. The micro-tubes extend out from a separate hole and open onto the surface of the TBC, or a plurality of micro-tubes extends from a common hole and spread out from the hole. The micro-tubes are formed from nickel or another high temperature resistant material and have a diameter of about 0.009 inches.

10 Claims, 2 Drawing Sheets

TURBINE AIRFOIL WITH MICRO-TUBES EMBEDDED WITH A TBC

CROSS-REFERENCE TO RELATED APPLICATIONS

This application claims the benefits to an earlier filed U.S. Provisional application 60/722,816 filed on Sep. 30, 2005 and entitled TURBINE AIRFOIL with MICRO-TUBES EMBEDDED IN a TBC.

BACKGROUND OF THE INVENTION

1. Field of the Invention

The present invention relates generally to thermal barrier coatings (TBC), and more specifically to a fluid reaction surface with a TBC.

2. Description of the Related Art Including Information Disclosed Under 37 CFR 1.97 and 1.98

A gas turbine engine includes a compressor, a combustor, and a turbine. The compressor compresses air and delivers the compressed air to the combustor where the compressed air is mixed with a fuel and burned. The hot gas stream exiting the combustor is passed through the turbine to produce rotary motion and useful work from the engine. The efficiency of the gas turbine engine increases as the hot gas temperature entering the turbine increases. It is desirable to design a turbine to operate at the highest gas flow temperature possible without burning up the turbine parts such as guide vanes and rotary blades. Cooling air has been passed through the upstream stages of the vanes and blades in the turbine in order to cool these parts and allow for higher gas stream temperatures. A ceramic thermal barrier coating (TBC) has also been applied to parts of the vanes and blades that are exposed to the high temperature gas flow in order to protect the airfoil surfaces from the extreme temperature.

Recently, designers of turbine airfoils have tried to apply even thicker TBC to the airfoil surfaces. However, as the thickness of the TBC increases, the ease at which chunks of TBC can break off (spalling) increases. A thicker TBC will allow for higher gas flow temperature without damaging the airfoil surface below the TBC. It is therefore desirable to allow for a thicker TBC without increasing the likelihood that spalling of the TBC will occur.

U.S. Pat. No. 6,551,061 issued to Darolia et al. on Apr. 22, 2003 shows a Process For Forming Micro Cooling Channels Inside a Thermal Barrier Coating System Without Masking Material in which the TBC is formed of a first and a second TBC layer, and in micro cooling channels are formed between adjacent surfaces of the inner TBC and the bond coat to provide cooling to the TBC. The micro cooling channels in this patent do not pass entirely within the TBC layer and do not open onto the TBC surface on which the hot gas stream contacts.

Another patent, U.S. Pat. No. 6,617,003 issued to Lee et al. on Sep. 9, 2003 entitled Directly Cooled Thermal Barrier Coating System shows a TBC applied over a bond coat which is applied over a substrate of an airfoil used in the turbine, where micro channels are formed entirely within the bond coat, within adjacent surfaces between the substrate and the bond coat, between adjacent surfaces of the bond coat and a inner layer of TBC, and wholly within the layer of the inner TBC. However, the micro channels in this patent are formed within the actual bond coat or TBC materials and do not open onto the exposed surface of the TBC on which the hot gas stream contacts.

U.S. Pat. No. 6,761,956 issued to Lee et al. on Jul. 13, 2004 and entitled Ventilated Thermal Barrier Coating shows an airfoil of a turbine having a TBC applied on the airfoil substrate, and cooling holes passing formed within the TBC and passing from the substrate to the surface of the TBC for cooling. The holes are formed within the TBC by laser drilling.

When a TBC is applied to a metal substrate of an airfoil that has cooling holes therein, a mask is applied over the holes before the TBC is applied to prevent the holes from being covered over by the applied TBC. When the TBC has hardened and cooled, the mask is removed, leaving sharp edges on the TBC where the mask was. The surface of the cooling holes under the mask is exposed to the hot gas temperature, and the sharp edges on the TBC can break off in use.

It is therefore an object of the present invention to provide for a TBC that can operate at a higher temperature than the prior art.

It is another object of the present invention to provide for a TBC that is reinforced.

It is an additional object of the present invention to provide cooling for the TBC as well as to provide increased strength to the TBC to reduce spalling.

It is still another object of the present invention to eliminate exposed substrate surfaces around cooling holes due to the masking when a TBC is applied to the substrate.

BRIEF SUMMARY OF THE INVENTION

The present invention is a gas turbine engine with vanes and blades in the turbine section that includes a TBC on the airfoils. The TBC includes within the layer a plurality of randomly arranged or strategically arranged micro-tubes than are capable of passing cooling air through the tubes. The tubes start from a cooling air hole formed in the metal airfoil substrate and pass to the outer surface of the TBC. The micro-tubes are flexible and small enough to fit within the layer of TBC. The micro-tubes allow for cooling air to pass through and cool the TBC as well as act as fiber reinforcement for the TBC. The micro-tubes allow for a thicker TBC as well as provide cooling and reinforcement to the TBC. Therefore, a higher gas stream temperature can be used in the turbine section for improved overall efficiency of the gas turbine engine.

DETAILED DESCRIPTION OF THE INVENTION

Figure 1:
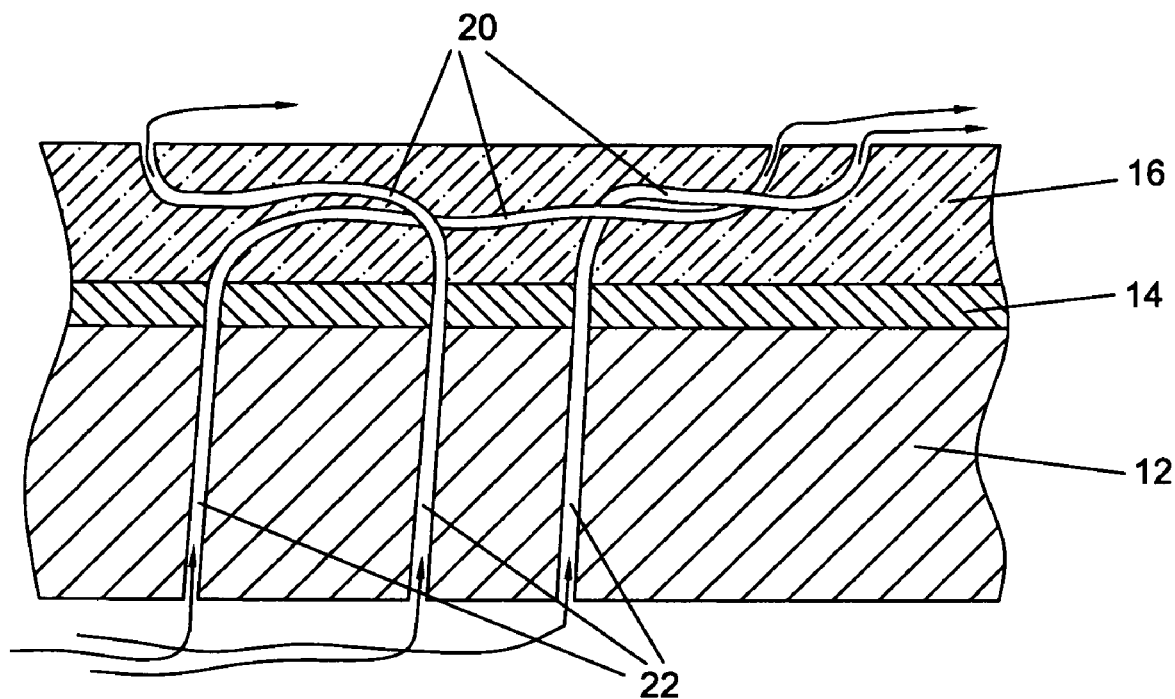
FIG. 1 shows a cross section view of a turbine airfoil substrate having a plurality of micro-tubes passing through the TBC.

An airfoil within a turbine section of a gas turbine engine includes a TBC applied on the surface to protect the airfoil from the extreme temperatures operating in the gas turbine engine. The airfoil metal substrate 12 has a bond coat 14 applied to the substrate, and a TBC 16 is applied to the bond coat. The bond coating and the TBC can be made of any of the well known materials used to protect the airfoil surfaces, as is disclosed in the Darolia et al U.S. Pat. No. 6,551,061 which is incorporated herein by reference. The micro-tubes are placed in a cooling hole that is formed in the substrate metal of the airfoil. Cooling holes like these are laser drilled into the airfoil surface to connect a cooling supply passage formed within the airfoil to supply cooling air to the surface of the airfoil. The micro-tubes are connected to the laser drilled holes and then laid down as best one could on the surface of the airfoil with the open ends preferably directed upward from the airfoil surface. A TBC is then applied to the airfoil surface such that the TBC will fully cover all but the open ends of the micro-tubes. When the TBC has cooled and hardened, the portions of the micro-tubes sticking out of the surface of the TBC are cut off so the openings on the micro-tubes are flush with the surface of the TBC. For purposes of the present invention, micro-tubes are defined to be a tube small enough to be covered within a standard thickness TBC without weakening the TBC due to the presence of the tubes.

One cooling hole in the airfoil substrate can supply one or more micro-tubes with cooling air. If more than one micro-tube originates from a single cooling hole in the substrate, it is preferred to spread out the plurality of micro-tubes such as in a star-shape pattern in order to provide internal cooling to the TBC surrounding the cooling hole in the substrate.

In additional to passing cooling air through the TBC, the micro-tubes also act as fiber reinforcement for the TBC since the micro-tubes are wholly embedded within the TBC. The micro-tubes are sized according to the thickness of the TBC layer. It is desirable to provide a micro-tube with as large a diameter as possible in the TBC to provide as much cooling air flow as would be needed to cool the immediate area around the TBC. However, the micro-tubes should be small enough in diameter so as not to weaken the stiffness of the TBC.

The micro-tubes are preferably made from a high temperature resistant metallic material that is capable of withstanding the extreme temperature environment within the TBC. The micro-tubes can be manufactured from a process disclosed like that in U.S. Pat. No. 6,133,722 issued to Hoffman et al. on Sep. 5, 2000, the disclosure of which is incorporated herein by reference. The micro-tubes disclosed in the Hoffman patent can be made of materials that include metals, polymers, carbon ceramics, and glasses, and the micro-tubes can be made as small as 5 nanometers in diameter.

Another embodiment for the micro-tubes is the stainless steel micro-tube made by the Accu-tube Corporation of Englewood, Colo. In the Hypodermic tube specifications manual from this company, the 32 Regular tube of 0.009 in diameter with 0.0025 in wall made of stainless steel would have the proper size to provide for the cooling and reinforcement to a TBC on an airfoil. In the present invention, the procedure used to form the micro-tube of stainless steel would be used to produce the micro-tube of nickel or another high temperature resistant material for use in the present invention.

Figure 2:
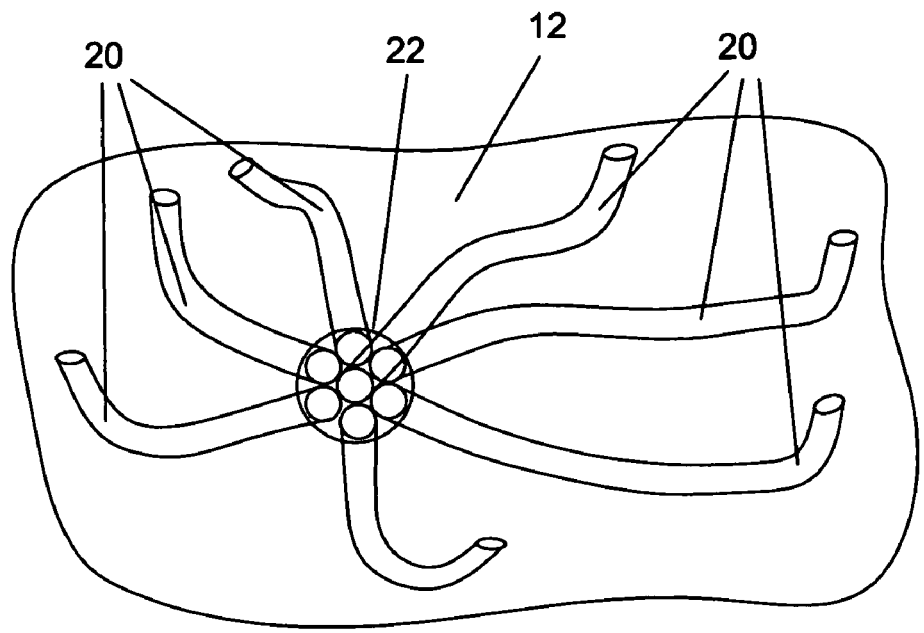
FIG. 2 shows a top view in which one cooling air supply hole supplies seven micro-tubes that are spread outward from the hole.
Figure 3:
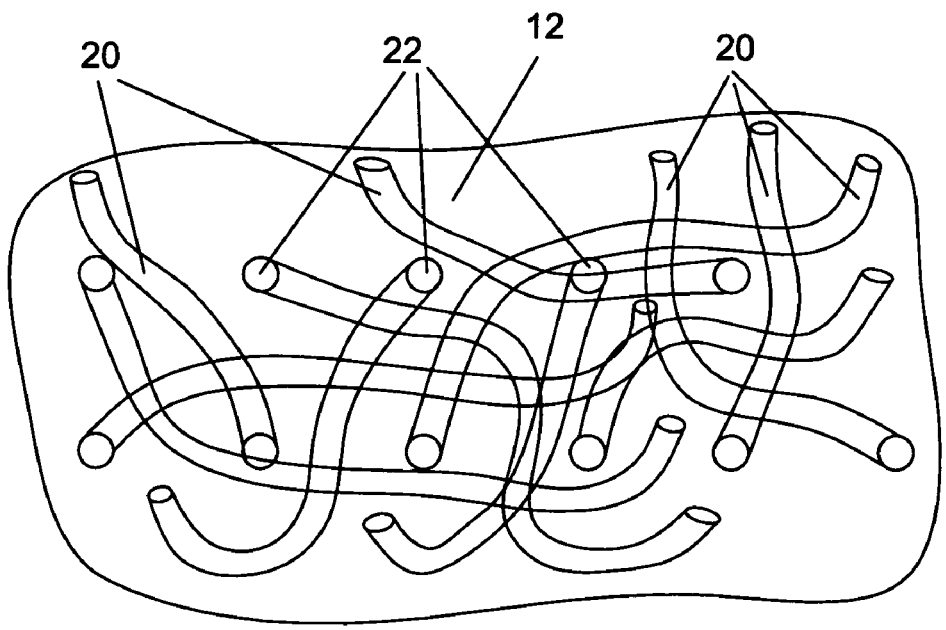
FIG. 3 shows a top view in which each cooling air supply hole is associated with a single micro-tube.

The micro-tubes 20 can be arranged on the airfoil substrate like that shown in FIG. 2, in which one cooling air supply hole 22 supplies cooling air to a plurality of micro-tubes 20 spreading outward from the hole, or like that shown in FIG. 3 in which each hole 22 is associated with only one micro-tube 20. The micro-tubes 20 spread outward in a pattern that results in the micro-tubes 20 weaving between other micro-tubes in order to produce the fiber reinforcement for the TBC. The length of the micro-tubes can vary depending upon heat transfer rates from the TBC to the cooling air flowing through the tubes and the number of micro-tubes associated with the airfoil substrate surface.

To produce an airfoil with micro-tubes embedded within a TBC layer, and airfoil substrate having a plurality of cooling air supply holes is formed. The micro-tubes are then placed in the holes according to the FIG. 2 or FIG. 3 embodiments, spread outward from the holes in a pattern that results in weaving of the micro-tubes, with the open ends of each micro-tube extending substantially normal to the substrate surface. A TBC layer is then applied over the substrate in the area on which the micro-tubes are positioned. When the TBC layer is hardened, the tops of the tubes sticking out of the TBC is removed such that the tube opening is flush with the TBC surface. The tubes should extend out from the TBC enough to prevent the TBC from filling in the micro-tubes to the point where cutting off the tops of the tubes will result in a clear tube with no TBC inside.

In another embodiment of the present invention, the airfoil can have one or more long strands of the micro-tubes wrapping around the airfoil portion that requires the TBC several times before rising through the TBC. This would increase the length in which the cooling air would pass through the TBC before being discharged onto the TBC surface. This embodiment would also be easier to install since one row of cooling holes could be used, and each hole could supply a micro-tube that would cover the entire radial section in which the hole is located because of the multiple wrapping of the tube around the airfoil.

The present invention is described as a micro-tube reinforced TBC used on a turbine airfoil. However, the present invention is not intended to be limited to TBCs on turbine airfoils such as blades and vanes. The present invention is intended to cover any substrate for any purpose in which a TBC is used to protect the substrate from the high temperature environment. Any substrate that makes use of a TBC can be improved on by using the micro-tubes of the present invention that not only provides reinforcement to the TBC but also provides cooling to the TBC by passing a cooling fluid through the tubes.

I claim:

1. A thermal barrier coating, the thermal barrier coating being applied to a substrate for protection from a high temperature environment, the coating comprising:
    a plurality of micro-tubes embedded within the thermal barrier coating to provide reinforcement and cooling to the thermal barrier coating;
    where the cooling is performed by passing a cooling fluid through the micro-tubes.

2. The thermal barrier coating of claim 1, and further comprising:
    a plurality of the micro-tubes extends from the same cooling supply hole in the substrate and spread out from the hole.

3. The thermal barrier coating of claim 1, and further comprising:
    at least some of the micro-tubes wrap around the substrate.

4. A turbine airfoil comprising:
    a thermal barrier coating applied to selective areas for protection from a high temperature flow;
    an internal cooling supply channel to supply cooling air to the airfoil;
    a cooling supply hole within the airfoil under the thermal barrier coating; and,
    a micro-tube embedded within the thermal barrier coating and connected to the cooling supply hole on one end and opening onto the surface of the thermal barrier coating on the other end, the micro-tube providing for reinforcement of the thermal barrier coating and for cooling thereof;
    where the cooling is performed by passing a cooling fluid through the micro-tubes.

5. The turbine airfoil of claim 4, and further comprising:
a plurality of micro-tubes extending from one cooling supply hole and spreading out from the one supply cooling hole throughout the thermal barrier coating.

6. The turbine airfoil of claim 4, and further comprising:
a plurality of cooling supply holes, and each cooling supply hole having at least one cooling outlet hole connected thereto and opening onto the surface of the thermal barrier coating to provide reinforcement to and cooling for the thermal barrier coating.

7. The turbine airfoil of claim 4, and further comprising:
the micro-tube wraps around the airfoil.

8. A process for forming an air cooled turbine airfoil having a thermal barrier coating applied to a selective surface of the airfoil, the process comprising the steps of:
forming a turbine airfoil with an internal cooling supply passage;
forming a plurality of cooling holes in the selective surface of the airfoil, each hole connecting the internal cooling supply passage;
connecting a plurality of micro-tubes to the cooling holes;
spreading the micro-tubes over the selective surface of the airfoil;
applying a thermal barrier coating to the selective surface to cover the micro-tubes except on the ends; and,
removing the ends of the micro-tubes that stick out past the thermal barrier coating;
where a cooling fluid can pass through the micro-tubes to provide cooling to the thermal barrier coating.

9. The process for forming an air cooled turbine airfoil of claim 8, and further comprising the step of:
connecting a plurality of micro-tubes to a single cooling hole and spreading the micro-tubes out from the cooling hole.

10. The process for forming an air cooled turbine airfoil of claim 8, and further comprising the step of:
wrapping the micro-tubes around the airfoil.

\* \* \* \* \*